US012654867B2

(12) United States Patent　　　(10) Patent No.:　US 12,654,867 B2
Kim et al.　　　　　　　　　　　(45) Date of Patent:　Jun. 16, 2026

(54) POWER SUPPLY DEVICE FOR AIR MOBILITY AND METHOD THEREOF

(71) Applicants:HYUNDAI MOTOR COMPANY, Seoul (KR); KIA CORPORATION, Seoul (KR)

(72) Inventors: Jong Pil Kim, Hwaseong-si (KR); Hyun Ki Cho, Hwaseong-si (KR); Yoon Cheol Jeon, Hwaseong-si (KR); Woo Young Lee, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/917,124

(22) Filed: Oct. 16, 2024

(65) Prior Publication Data

US 2025/0304270 A1　　Oct. 2, 2025

(30) Foreign Application Priority Data

Mar. 28, 2024　(KR) ........................ 10-2024-0042699

(51) Int. Cl.
B60L 3/00　　　(2019.01)
B64D 27/355　　(2024.01)
(52) U.S. Cl.
CPC ........ B64D 27/355 (2024.01); B64D 2221/00 (2013.01)
(58) Field of Classification Search
None
See application file for complete search history.

(56) References Cited

U.S. PATENT DOCUMENTS 10,793,020 B2　10/2020　Lee et al.
11,605,855 B2　3/2023　Oya
(Continued)

FOREIGN PATENT DOCUMENTS

JP　　2006286320 A　10/2006
JP　　2010004628 A　1/2010
(Continued)

OTHER PUBLICATIONS

Alastair, P. et al., "Analysis and Modeling of UAV Power System Architectures." 2019 IEEE Transportation Electrification Conference and Expo (ITEC), IEEE, Jun. 19, 2019 (Jun. 19, 2019), pp. 1-8, XP033592627, DOI: 10.1109/ITEC.2019.8790566, [retrieved on Aug. 6, 2019].
Menzi, D. et al., "Ultralightweight High-Efficiency Buck-Boost DC-DC Converters for Future eVTOL Aircraft With Hybrid Power Supply," IEEE Transactions on Transportation Electrification, IEEE, vol. 10, No. 4, Mar. 7, 2024 (Mar. 7, 2024), pp. 10297-10313, XP011991537, DOI: 10.1109/TTE.2024.3375026, [retrieved on Mar. 7, 2024].
(Continued)

*Primary Examiner* — Menatoallah Youssef
*Assistant Examiner* — Aqeel H Bukhari
(74) *Attorney, Agent, or Firm* — MCDONNELL BOEHNEN HULBERT & BERGHOFF LLP

(57)　　　ABSTRACT
Disclosed are a power supply device for air mobility and a method thereof. The power supply device includes a plurality of power supply lines that distribute power of a fuel cell stack in parallel, one-to-one matches the plurality of power supply lines with a plurality of rotor structures. The power supply device supplies power to one rotor structure through one power supply line, thereby supplying power to the remaining rotor structures through the remaining power supply lines even when a short circuit occurs in a semiconductor switching element on any one of the plurality of power supply lines.

18 Claims, 9 Drawing Sheets

(56)     References Cited

U.S. PATENT DOCUMENTS

| 11,824,410 | B1 | 11/2023 | Chong et al. | |
| 2006/0222909 | A1 | 10/2006 | Aoyagi et al. | |
| 2006/0222910 | A1 | 10/2006 | Aoyagi et al. | |
| 2009/0008166 | A1 | 1/2009 | Aoyagi et al. | |
| 2009/0008167 | A1 | 1/2009 | Aoyagi et al. | |
| 2012/0098336 | A1 | 4/2012 | Gurunathan et al. | |
| 2015/0127660 | A1 | 5/2015 | Zilberberg et al. | |
| 2015/0217660 | A1 | 8/2015 | Manabe et al. | |
| 2019/0152330 | A1 | 5/2019 | Lee et al. | |
| 2020/0331352 | A1* | 10/2020 | Sheffield | B60L 3/0092 |
| 2021/0229822 | A1* | 7/2021 | Morrison | H01M 8/04029 |
| 2022/0009625 | A1* | 1/2022 | Bower | H02J 1/08 |
| 2022/0200085 | A1 | 6/2022 | Oya | |
| 2023/0391460 | A1 | 12/2023 | Atluri et al. | |

FOREIGN PATENT DOCUMENTS

| JP | 2022098023 | A | 7/2022 |
| KR | 20190059060 | A | 5/2019 |

OTHER PUBLICATIONS

Swaminathan, N. et al., "Flying Cars and eVTOLs-Technology Advancements, Powertrain Architecture, and Design," IEEE Transactions on Transportation Electrification, IEEE, vol. 8, No. 4, May 5, 2022 (May 5, 2022), pp. 4105-4117, XP011924629, DOI: 10.1109/TTE.2022.3172960 [retrieved on May 5, 2022].

* cited by examiner

Node 1 → 300
330
Motor #1 — 320
INV #1 — 310

Node 2 → 400
Motor #2
INV #2

Node 3 → 500
Motor #n
INV #n

START

ONE-TO-ONE MATCHING PLURAL POWER SUPPLY
LINES THAT DISTRIBUTE POWER OF FUEL CELL STACK ~801
IN PARALLEL WITH PLURAL ROTOR STRUCTURES

SUPPLY POWER TO ONE ROTOR
STRUCTURE THROUGH ONE POWER SUPPLY LINE ~802

END

POWER SUPPLY DEVICE FOR AIR MOBILITY AND METHOD THEREOF

CROSS-REFERENCE TO RELATED APPLICATION

This application claims the benefit of priority to Korean Patent Application No. 10-2024-0042699, filed in the Korean Intellectual Property Office on Mar. 28, 2024, the entire contents of which are incorporated herein by reference.

TECHNICAL FIELD

The present disclosure relates to a technology for supplying power to air mobility even when a short circuit occurs in a semiconductor switching element in a fuel cell converter.

BACKGROUND

In general, advanced air mobility (AAM) has been used as a concept that encompasses urban air mobility (UAM), regional air mobility (RAM), and unmanned aircraft system (UAS). In this case, UAM refers to an electric vertical take-off and landing (eVTOL) aircraft for short-distance movement within the city. The RAM and UAS refer to aircraft for long-distance movement between regions and aircraft for logistics transport, respectively, and mainly use an electric conventional take-off and landing (eCTOL) or electric short take-off and landing (eSTOL) scheme.

Because such AAM uses a plurality of batteries (e.g., lithium-ion batteries) as a power source, the safety of the batteries is of utmost importance. In particular, when the battery power is not supplied during flight, it may cause a fatal accident (e.g., a crash), so it may be necessary to have a redundancy battery and easily switch between activating and deactivating the redundancy battery.

Meanwhile, when a plurality of batteries provided in an AAM are connected in parallel, all batteries may have the same voltage and capacity, and a DC-DC converter may be provided for each battery to constantly adjust the voltages of batteries.

To the contrary, when a plurality of batteries are connected in series, because the voltage of each battery does not need to be the same as the system voltage, there is no need to provide a DC-DC converter, and the weight of a surplus battery may be minimized. In particular, in a parallel battery structure, the lower limit voltage of the battery drops depending on battery usage, whereas in a series battery structure, when the system voltage drops depending on battery usage, the lower limit voltage of the system is maintained above a certain level by connecting a surplus battery.

This is directly related to the motor design voltage of AAM. When the system voltage is high in the process of producing a constant output, the energizing current may be lowered, which minimizes heat generation on the motor side. Accordingly, the series battery structure is suitable for aviation because the weight of equipment for cooling a motor is minimized. However, in order to connect batteries in series, it is necessary to consider a structure for connecting a plurality of switches to a battery terminal block and a scheme of controlling the plurality of switches.

In addition, because the AAM consumes more energy to rise to a cruising altitude (e.g., 500 to 600 m) than when cruising, it is necessary to consider what characteristics the batteries should have and how to operate them.

According to a conventional technology for supplying power to such air mobility, power is supplied to a plurality of rotor structures (rotor+motor+inverter) in a state in which the plurality of rotor structures are collectively connected to the output terminal of a fuel cell converter. Therefore, according to the conventional technology, even though a short circuit occurs in any one of a plurality of semiconductor switching elements provided in the converter, power supply to all rotor structures is cut off.

This is a matter directly related to the safety of passengers due to the nature of air mobilization. Even when a short circuit occurs in some semiconductor switching elements in a fuel cell converter, a scheme is required to stably provide power for safe landing of the air mobility.

The matters described in this background section are intended to promote an understanding of the background of the disclosure and may include matters that are not already known to those of ordinary skill in the art.

SUMMARY

The present disclosure has been made to solve the above-mentioned problems occurring in the prior art while advantages achieved by the prior art are maintained intact.

An aspect of the present disclosure provides a power supply device for air mobility that includes a plurality of power supply lines that distribute power of a fuel cell stack in parallel, one-to-one matches the plurality of power supply lines with a plurality of rotor structures, and supplies power to one rotor structure through one power supply line, thereby supplying power to the remaining rotor structures through the remaining power supply lines even when a short circuit occurs in a semiconductor switching element on any one of the plurality of power supply lines, and a method thereof.

Another aspect of the present disclosure provides a power supply device for air mobility that includes a first parallel line for supplying the power of a fuel cell stack to a first rotor structure, a second parallel line for supplying the power of the fuel cell stack to a second rotor structure, and a third parallel line for supplying the power of the fuel cell stack to a third rotor structure, thereby supplying power to the remaining rotor structures through the remaining power supply lines even when a short circuit occurs in a semiconductor switching element on any one of the plurality of power supply lines, and a method thereof.

Still another aspect of the present disclosure provides a power supply device for air mobility that includes a plurality of power supply lines that distribute power of a fuel cell stack in parallel, one-to-one matches the plurality of power supply lines with a plurality of rotor structures, and includes fuses on each power supply line, thereby supplying power to the remaining rotor structures through the remaining power supply lines even when a short circuit occurs in a semiconductor switching element on any one of the plurality of power supply lines, and a method thereof.

Still another aspect of the present disclosure provides a power supply device for air mobility that includes a first parallel line for supplying the power of a fuel cell stack to a first rotor structure, a second parallel line for supplying the power of the fuel cell stack to a second rotor structure, a third parallel line for supplying the power of the fuel cell stack to a third rotor structure, and fuses on each parallel line, thereby supplying power to the remaining rotor structures through the remaining power supply lines even when a short circuit occurs in a semiconductor switching element on any one of the plurality of power supply lines, and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a power supply device for air mobility includes a fuel cell stack that supplies power to the air mobility, and a converter that includes a plurality of power supply lines that distribute power of the fuel cell stack in parallel, and one-to-one matches the plurality of power supply lines with a plurality of rotor structures and supply power to one rotor structure through one power supply line.

According to an embodiment, the converter may include a first power supply line that distributes the power of the fuel cell stack in parallel and supplies the power to a first rotor structure, a second power supply line that distributes the power of the fuel cell stack in parallel and supplies the power to a second rotor structure, and a third power supply line that distributes the power of the fuel cell stack in parallel and supplies the power to a third rotor structure.

According to an embodiment, the first power supply line may include a first fuse, a second fuse, a first semiconductor switching element, and a second semiconductor switching element.

According to an embodiment, the first fuse may open-circuit the first power supply line in a circuit when a short circuit occurs in the first semiconductor switching element.

According to an embodiment, the second fuse may open-circuit the first power supply line in a circuit when a short circuit occurs in the second semiconductor switching element.

According to an embodiment, the second power supply line may include a third fuse, a fourth fuse, a third semiconductor switching element, and a fourth semiconductor switching element.

According to an embodiment, the third fuse may open-circuit the second power supply line in a circuit when a short circuit occurs in the third semiconductor switching element.

According to an embodiment, the fourth fuse may open-circuit the second power supply line in a circuit when a short circuit occurs in the fourth semiconductor switching element.

According to an embodiment, the third power supply line may include a fifth fuse, a sixth fuse, a fifth semiconductor switching element, and a sixth semiconductor switching element.

According to an embodiment, the fifth fuse may open-circuit the third power supply line in a circuit when a short circuit occurs in the fifth semiconductor switching element.

According to an embodiment, the sixth fuse may open-circuit the third power supply line in a circuit when a short circuit occurs in the sixth semiconductor switching element.

According to an embodiment, the rotor structure may include an inverter that converts DC power of the fuel cell stack into AC power, and a motor that is driven by the AC power to rotate the rotor.

According to another aspect of the present disclosure, a method of supplying power to air mobility includes one-to-one matching, by a converter, a plurality of power supply lines which distributes power of a fuel cell stack in parallel with a plurality of rotor structures, and supplying, by the converter, power to one rotor structure through one power supply line.

According to an embodiment, the supplying of the power to the rotor structure may include distributing, by a first power supply line, the power of the fuel cell stack in parallel to supply the power to a first rotor structure, distributing, by a second power supply line, the power of the fuel cell stack in parallel to supply the power to a second rotor structure, and distributing, by a third power supply line, the power of the fuel cell stack in parallel to supply the power to a third rotor structure.

According to an embodiment, the first power supply line may include a first fuse, a second fuse, a first semiconductor switching element, and a second semiconductor switching element.

According to an embodiment, the supplying of the poser to the first rotor structure may further include opening, by the first fuse, the first power supply line in a circuit when a short circuit occurs in the first semiconductor switching element, and opening, by the second fuse, the first power supply line in a circuit when a short circuit occurs in the second semiconductor switching element.

According to an embodiment, the second power supply line may include a third fuse, a fourth fuse, a third semiconductor switching element, and a fourth semiconductor switching element.

According to an embodiment, the supplying of the poser to the second rotor structure may further include opening, by the third fuse, the second power supply line in a circuit when a short circuit occurs in the third semiconductor switching element, and opening, by the fourth fuse, the second power supply line in a circuit when a short circuit occurs in the fourth semiconductor switching element.

According to an embodiment, the third power supply line may include a fifth fuse, a sixth fuse, a fifth semiconductor switching element, and a sixth semiconductor switching element.

According to an embodiment, the supplying of the poser to the third rotor structure may further include opening, by the fifth fuse, the third power supply line in a circuit when a short circuit occurs in the fifth semiconductor switching element, and opening, by the sixth fuse, the third power supply line in a circuit when a short circuit occurs in the sixth semiconductor switching element.

The features briefly summarized above with respect to the present disclosure are merely exemplary aspects of the detailed description of the present disclosure described below and do not limit the scope of the present disclosure.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
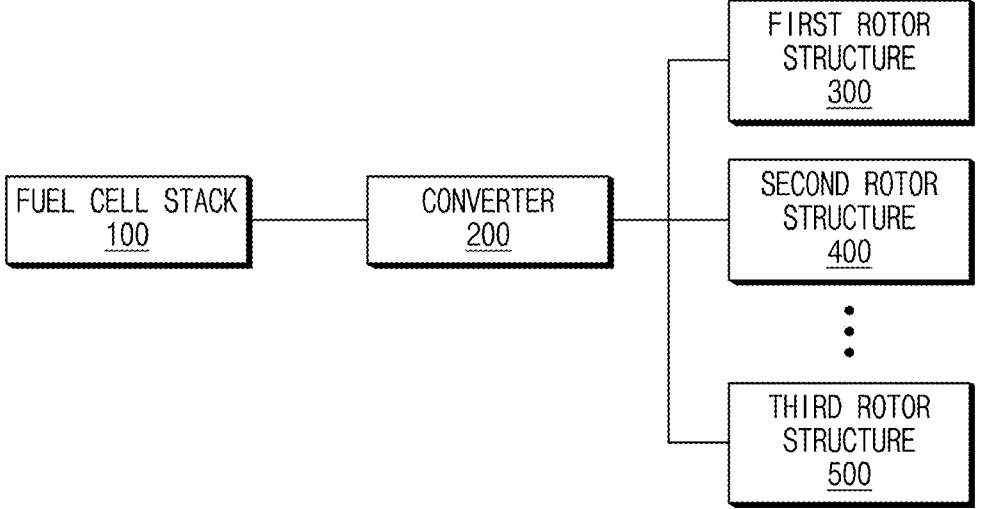
FIG. 1 is a block diagram illustrating the configuration of a power supply device for air mobility according to an embodiment of the present disclosure.

Hereinafter, various embodiments of the disclosure will be described in detail with reference to the accompanying drawings, so that those skilled in the art can easily carry out the inventive concept. However, the inventive concept is not limited to the embodiments set forth herein and may be modified variously in many different forms.

In describing the embodiments of the present disclosure, when a specific description of the related art is deemed to obscure the subject matter of the embodiments of the present disclosure, the detailed description will be omitted. In the drawings, the portions irrelevant to the description will not be shown in order to make the present disclosure clear.

It will be understood that when an element is referred to as being "connected" or "coupled" to another element, it may be directly connected or indirectly connected to another element. In addition, when some part 'includes' or "has" some elements, unless explicitly described to the contrary, it means that other elements may be further included but not excluded.

Expressions such as "first," or "second," and the like, may express their elements regardless of their priority or importance and may be used to distinguish one element from another element but is not limited to these components. Therefore, without departing from the scope of the present disclosure, a first component of one embodiment may be referred to as a second component of another embodiment. Similarly, a second component of one embodiment may be referred to as a first component of another embodiment.

In the present disclosure, components that are distinguished from each other are only for clearly describing characteristics, and do not mean that the components are necessarily separated. That is, a plurality of components may be integrated to form a single hardware or software unit, or a single component may be distributed to form a plurality of hardware or software units. Accordingly, such integrated or distributed embodiments are included in the scope of the present disclosure, even though not mentioned separately.

In the present disclosure, components described in various embodiments do not necessarily mean essential components, and some may be optional components. Therefore, an embodiment composed of a subset of components described in an embodiment is also included in the scope of the present disclosure. In addition, embodiments including other components in addition to the components described in various embodiments are also included in the scope of the present disclosure.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases.

In the present disclosure, expressions of positional relationships used herein, such as upper, lower, left, right, and the like, are described for convenience of description. When viewing the drawings shown in this specification in reverse, the positional relationship described in the specification may be interpreted in the opposite manner.

Advantages and features of embodiments of the present disclosure, and method for achieving thereof will be apparent with reference to the accompanying drawings and detailed description that follows. But, it should be understood that the present disclosure is limited to the following embodiments and may be embodied in different ways, and that the embodiments are given to provide complete disclosure and to provide thorough understanding of the present disclosure to those skilled in the art.

FIG. 1 is a block diagram illustrating the configuration of a power supply device for air mobility according to an embodiment of the present disclosure.

As shown in FIG. 1, a power supply device for air mobility according to an embodiment of the present disclosure may include a fuel cell stack 100, a converter 200, a first rotor structure 300, a second rotor structure 400, and a third rotor structure 500. In this case, depending on a scheme of implementing the power supply device for air mobility according to an embodiment of the present disclosure, components may be combined with each other to be implemented as one, or some components may be omitted. In addition, a rotor structure collectively refers to a rotor, a motor, and an inverter.

Regarding each component, first, the fuel cell stack 100, which is a module that supplies power to air mobility, may provide takeoff and landing power as well as cruise power to air mobility.

The converter 200 may include a fuel cell DC-DC converter (FDC) and a bidirectional high-voltage DC-DC converter (BHDC), and may also boost and distribute the power of the fuel cell stack 100.

The converter 200 may include a plurality of power supply lines that distribute power of the fuel cell stack 100 in parallel, one-to-one match the plurality of power supply lines with the plurality of rotor structures 300, 400, and 500, and supply power to one rotor structure through one power supply line.

In this case, the converter 200 may include a first parallel line (or a first power supply line) that distributes the power from the fuel cell stack 100 and supplies the power to the first rotor structure 300, a second parallel line (or a second power supply line) that distributes the power from the fuel cell stack 100 and supplies the power to the second rotor structure 400, and a third parallel line (or a third power supply line) that distributes the power from the fuel cell stack 100 and supplies the power to the third rotor structure 500.

Figure 2:
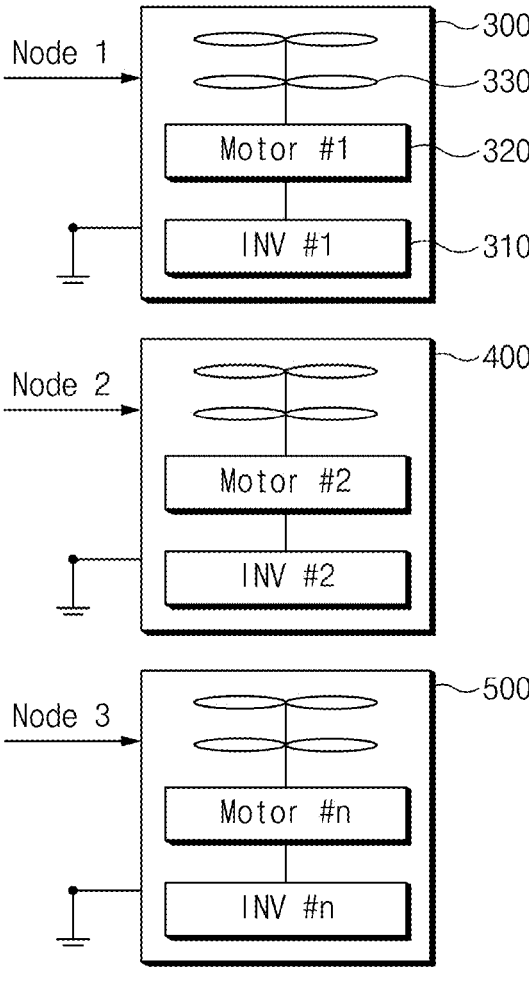
FIG. 2 is a diagram illustrating the configuration of a rotor structure provided in air mobility to which an embodiment of the present disclosure is applied.

FIG. 2 is a diagram illustrating the configuration of a rotor structure provided in air mobility to which an embodiment of the present disclosure is applied.

As shown in FIG. 2, the plurality of rotor structures provided in air mobility all have the same specification and configuration. For example, the first rotor structure 300 may include an inverter 310, a motor 320, and a rotor 330. In this case, the inverter 310 may convert DC power into AC power and transmit the AC power to the motor 320, and the motor 320 may be driven by the AC power and rotate the rotor 330.

Figure 3:
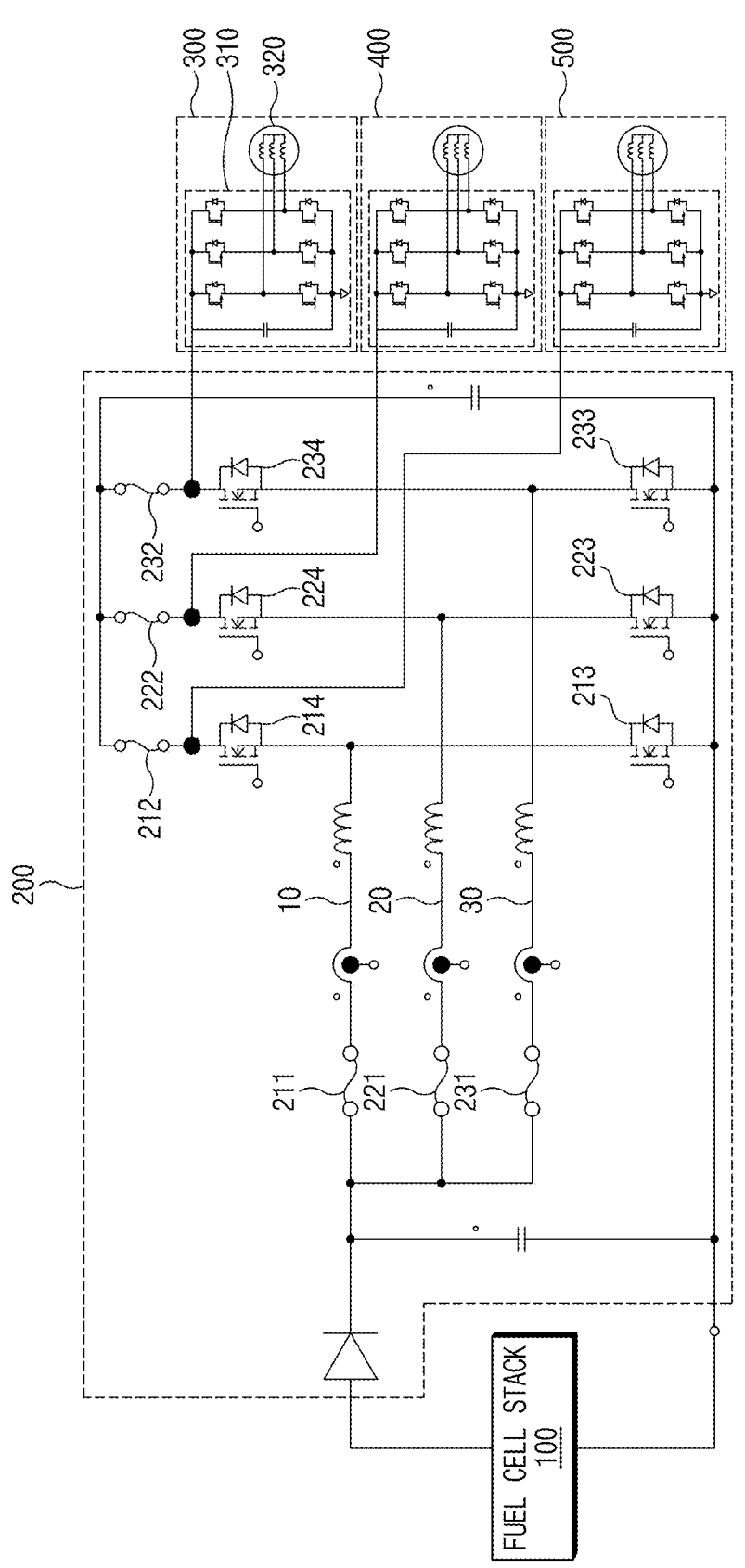
FIG. 3 is a diagram illustrating the detailed configuration of a power supply device for air mobility according to an embodiment of the present disclosure.

FIG. 3 is a diagram illustrating the detailed configuration of a power supply device for air mobility according to an embodiment of the present disclosure.

As shown in FIG. 3, the converter 200 provided in an power supply device for air mobility according to an embodiment of the present disclosure may include a first parallel line 10 that distributes the power from the fuel cell stack 100 and supplies the power to the first rotor structure 300, a second parallel line 20 that distributes the power from the fuel cell stack 100 and supplies the power to the second rotor structure 400, and a third parallel line 30 that distributes the power from the fuel cell stack 100 and supplies the power to the third rotor structure 500.

In this case, the first parallel line 10 may include a first fuse 211, a second fuse 212, a first semiconductor switching element 213, and a second semiconductor switching element 214. In this case, when a short circuit occurs in the first semiconductor switching element 213, the first fuse 211 is burned out and the first parallel line 10 is opened in a circuit. In addition, when a short circuit occurs in the second semiconductor switching element 214, the second fuse 212 is burned out and the first parallel line 10 is opened in the circuit.

In addition, the second parallel line 20 may include a third fuse 221, a fourth fuse 222, a third semiconductor switching element 223, and a fourth semiconductor switching element 224. In this case, when a short circuit occurs in the third semiconductor switching element 223, the third fuse 221 is burned out and the second parallel line 20 is opened in a circuit. In addition, when a short circuit occurs in the fourth semiconductor switching element 224, the fourth fuse 222 is burned out and the second parallel line 20 is opened in the circuit.

In addition, the third parallel line 30 may include a fifth fuse 231, a sixth fuse 232, a fifth semiconductor switching element 233, and a sixth semiconductor switching element 234. In this case, when a short circuit occurs in the fifth semiconductor switching element 233, the fifth fuse 231 is burned out and the third parallel line 30 is opened in a circuit. In addition, when a short circuit occurs in the sixth semiconductor switching element 234, the sixth fuse 232 is burned out and the third parallel line 30 is opened in the circuit.

Figure 4:
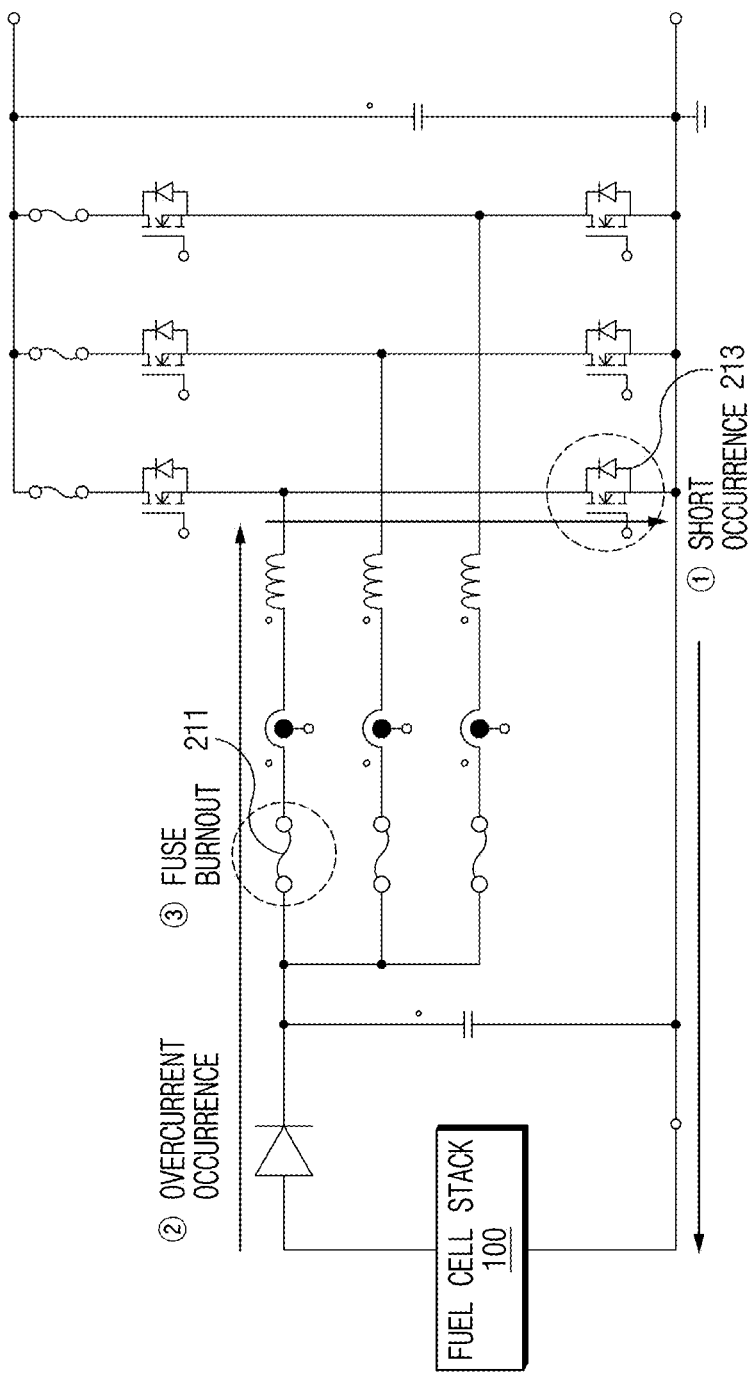
FIG. 4 is a diagram illustrating a burnout process of a first fuse when a short circuit occurs in a first semiconductor switching element on a first parallel line provided in a power supply device for air mobility according to an embodiment of the present disclosure.

FIG. 4 is a diagram illustrating a burnout process of the first fuse when a short circuit occurs in the first semiconductor switching element on the first parallel line provided in a power supply device for air mobility according to an embodiment of the present disclosure.

As shown in FIG. 4, when a short circuit occurs in the first semiconductor switching element 213 on the first parallel line 10, overcurrent flows through the first parallel line 10. The overcurrent causes burn out of the first fuse 211. Accordingly, as the first fuse 211 burns out, the first parallel line 10 is open-circuited in the circuit as shown in FIG. 5.

Figure 5:
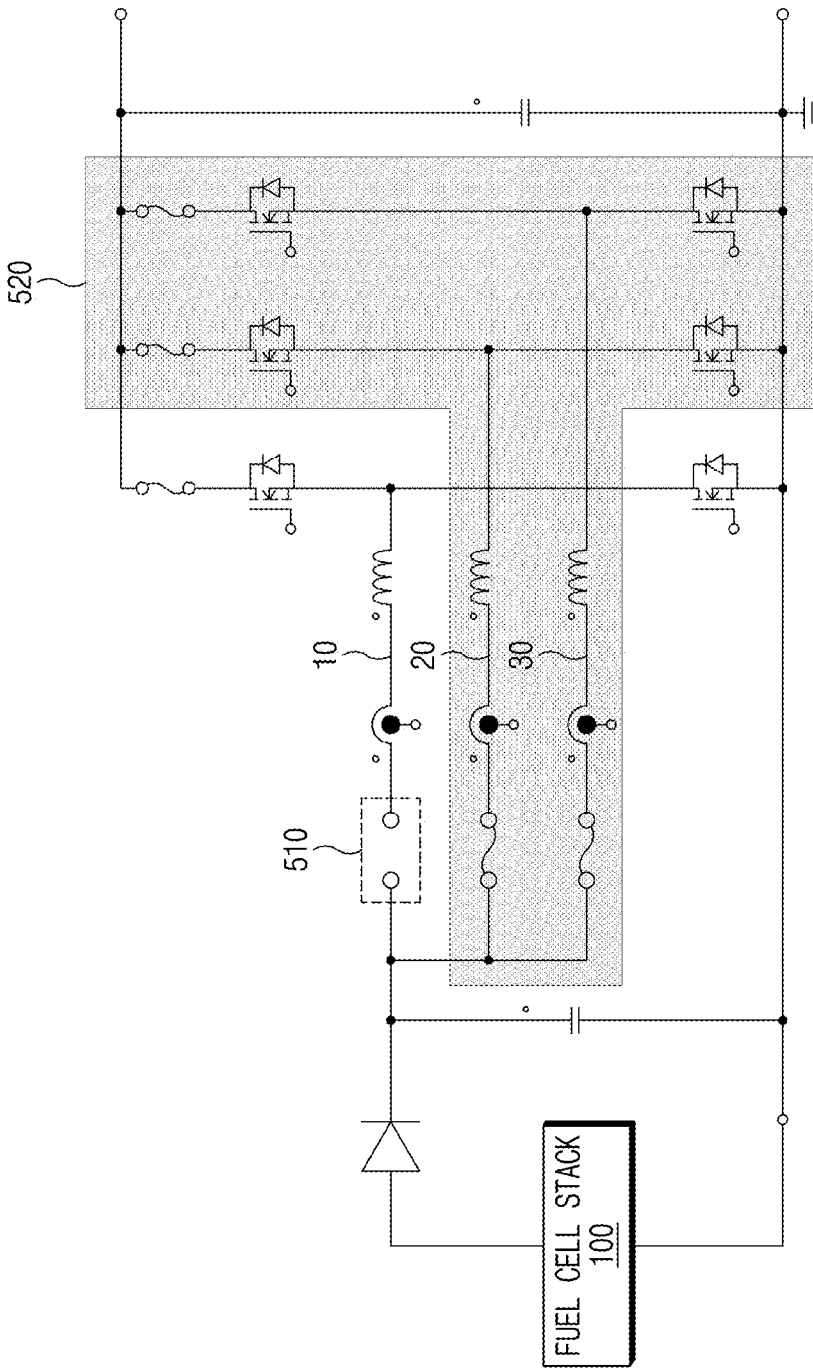
FIG. 5 is a diagram illustrating the operating state of a converter when a short circuit occurs in the first semiconductor switching element on the first parallel line provided in a power supply device for air mobility according to an embodiment of the present disclosure.

FIG. 5 is a diagram illustrating the operating state of a converter when a short circuit occurs in the first semiconductor switching element on the first parallel line provided in a power supply device for air mobility according to an embodiment of the present disclosure.

As shown in FIG. 5, when a short circuit occurs in the first semiconductor switching element 213 on the first parallel line 10, the first fuse 211 is burned out so that the first parallel line 10 is open-circuited 510 in the circuit. Accordingly, the first parallel line 10 no longer operates, but the second parallel line 20 and the third parallel line 30 may operate normally 520. That is, the second rotor structure 400 may operate normally by receiving power through the second parallel line 20, and the third rotor structure 500 may operate normally by receiving power through the third parallel line 30.

Figure 6:
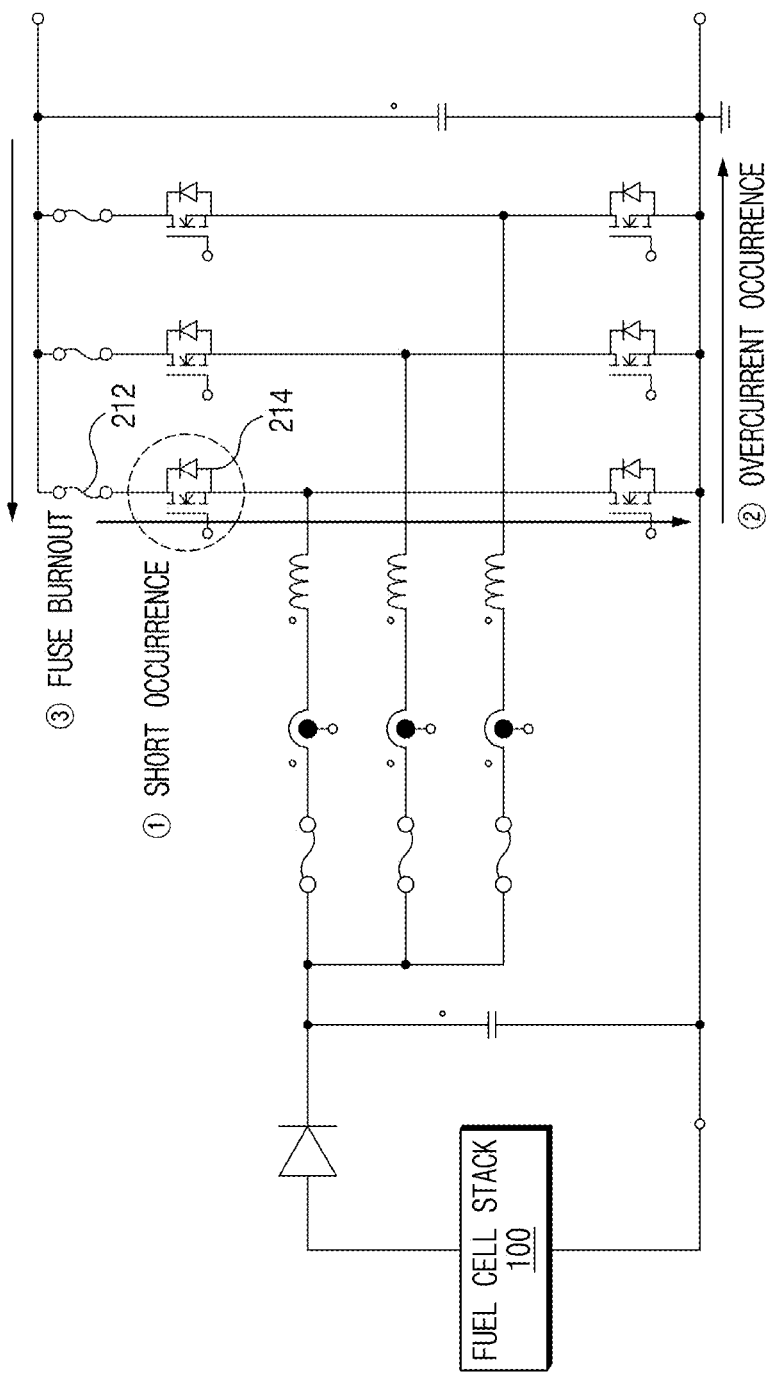
FIG. 6 is a diagram illustrating a burnout process of the second fuse when a short circuit occurs in the second semiconductor switching element on the first parallel line provided in a power supply device for air mobility according to an embodiment of the present disclosure.

FIG. 6 is a diagram illustrating a burnout process of the second fuse when a short circuit occurs in the second semiconductor switching element on the first parallel line provided in a power supply device for air mobility according to an embodiment of the present disclosure.

As shown in FIG. 4, when a short circuit occurs in the second semiconductor switching element 214 on the first parallel line 10, overcurrent flows through the first parallel line 10. The overcurrent causes burn out of the second fuse 212. Accordingly, as the second fuse 212 burns out, the first parallel line 10 is open-circuited in the circuit, as shown in FIG. 7.

Figure 7:
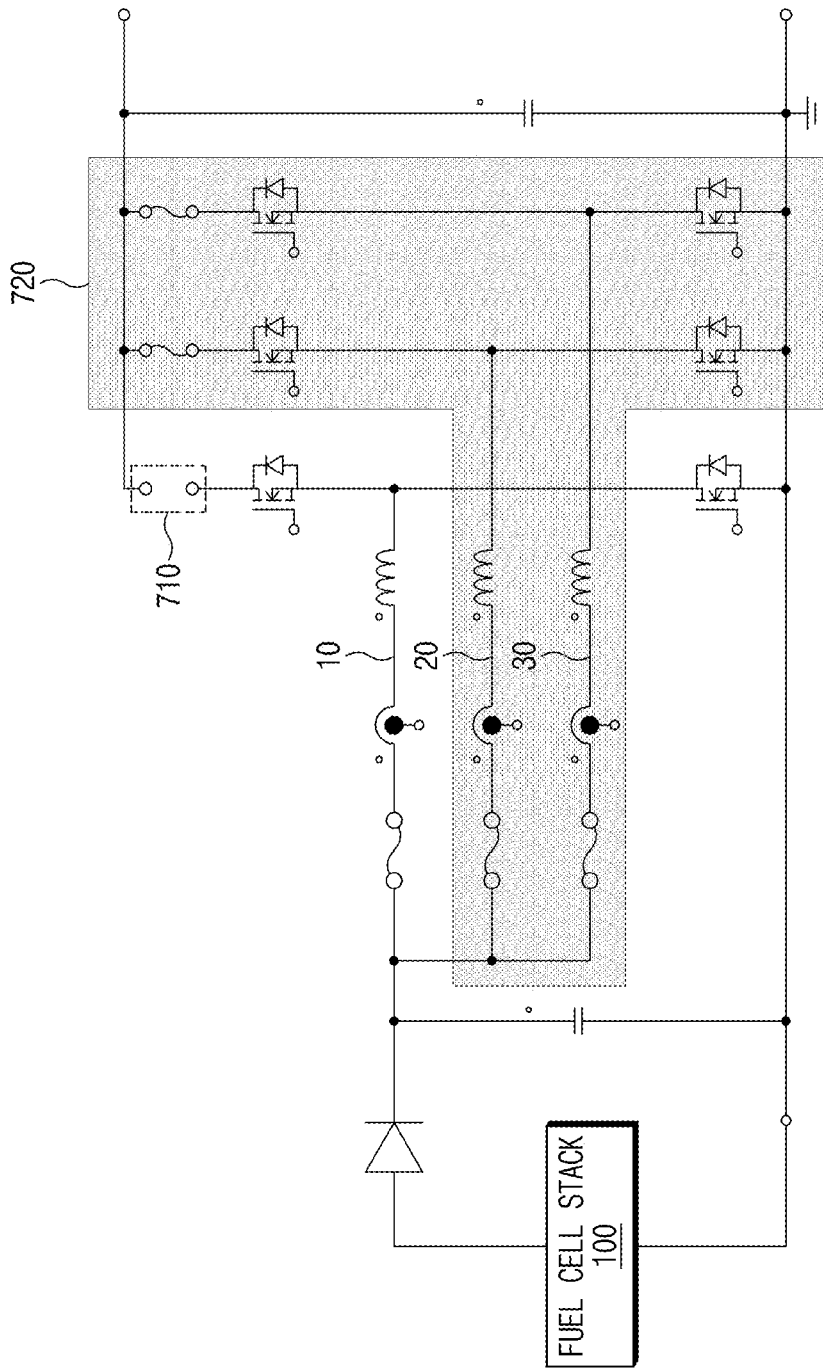
FIG. 7 is a diagram illustrating the operating state of a converter when a short circuit occurs in the second semiconductor switching element on the first parallel line provided in a power supply device for air mobility according to an embodiment of the present disclosure.

FIG. 7 is a diagram illustrating the operating state of a converter when a short circuit occurs in the second semiconductor switching element on the first parallel line provided in a power supply device for air mobility according to an embodiment of the present disclosure.

As shown in FIG. 7, when a short circuit occurs in the second semiconductor switching element 214 on the first parallel line 10, the second fuse 212 is burned out so that the first parallel line 10 is open-circuited 710 in the circuit. Accordingly, the first parallel line 10 no longer operates, but the second parallel line 20 and the third parallel line 30 may operate normally 720. That is, the second rotor structure 400 may operate normally by receiving power through the second parallel line 20, and the third rotor structure 500 may operate normally by receiving power through the third parallel line 30.

As described above, with reference to FIGS. 4 and 5, the operation of the converter 200 when a short circuit occurs in the first semiconductor switching element 213 on the first parallel line 10 has been described, and with reference to FIGS. 6 and 7, the operation of the converter 200 when a short circuit occurs in the second semiconductor switching element 214 on the first parallel line 10 has been described.

Because the operations of the converter 200 when a short circuit occurs in the third semiconductor switching element 223 on the second parallel line 20 or when a short circuit occurs in the fourth semiconductor switching element 224, and the operations of the converter 200 when a short circuit occurs in the fifth semiconductor switching element 233 on the third parallel line 30 or when a short circuit occurs in the sixth semiconductor switching element 234 may be inferred in the same scheme as those shown in FIGS. 4 to 7 described above, the details will be omitted.

In addition, in one embodiment of the present disclosure, three rotor structures are described as an example, but the number of rotor structures provided in air mobility has no effect on the embodiments of the present disclosure. That is, it is possible to increase the number of parallel lines in the converter 200 for one-to-one match with the number of rotor structures provided in air mobility.

Figure 8:
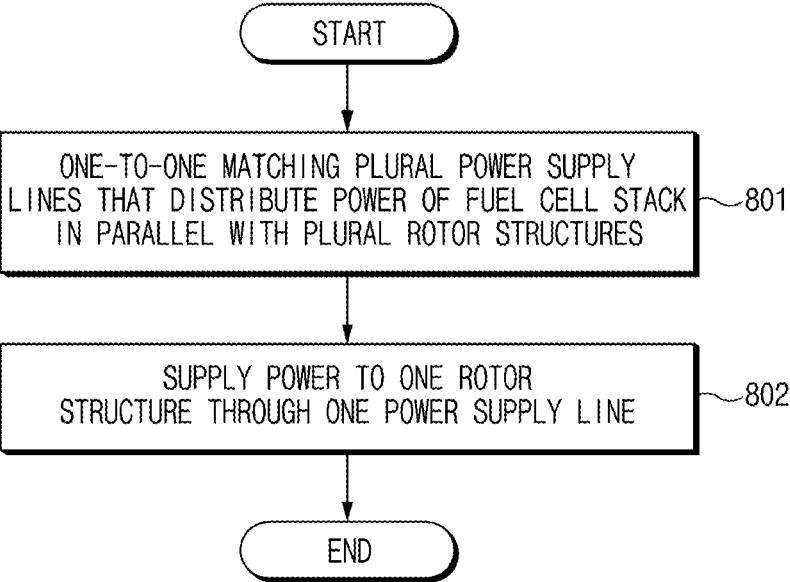
FIG. 8 is a flowchart illustrating a method of supplying power to air mobility according to an embodiment of the present disclosure.

FIG. 8 is a flowchart illustrating a method of supplying power to air mobility according to an embodiment of the present disclosure.

First, at step 801, the converter 200 matches a plurality of power supply lines that distribute the power of the fuel cell stack 100 in parallel with a plurality of rotor structures in one-to-one manner.

Then, at step 802, the converter 200 supplies power to one rotor structure through one power supply line.

In this case, the plurality of power supply lines may include a first power supply line 10 that distributes the power from the fuel cell stack 100 and supplies the power to the first rotor structure 300, a second power supply line 20 that distributes the power from the fuel cell stack 100 and supplies the power to the second rotor structure 400, and a third power supply line 30 that distributes the power from the fuel cell stack 100 and supplies the power to the third rotor structure 500.

In addition, the first power supply line 10 may include the first fuse 211, the second fuse 212, the first semiconductor switching element 213, and the second semiconductor switching element 214. When a short circuit occurs in the first semiconductor switching element 213, the first fuse 211 may allow the first power supply line 10 to be open-circuited in the circuit. When a short circuit occurs in the second semiconductor switching element 214, the second fuse 212 may allow the first power supply line 10 to be open-circuited in the circuit.

In addition, the second power supply line 20 may include the third fuse 221, the fourth fuse 222, the third semiconductor switching element 223, and the fourth semiconductor switching element 224. When a short circuit occurs in the third semiconductor switching element 223, the third fuse 221 may allow the second parallel line 20 to be open-circuited in the circuit. When a short circuit occurs in the fourth semiconductor switching element 224, the fourth fuse 222 may allow the second power supply line 20 to be open-circuited in the circuit.

In addition, the third power supply line 30 may include the fifth fuse 231, the sixth fuse 232, the fifth semiconductor switching element 233, and the sixth semiconductor switching element 234. When a short circuit occurs in the fifth semiconductor switching element 233, the fifth fuse 231 may allow the third power supply line 30 to be open-circuited in the circuit. When a short circuit occurs in the sixth semiconductor switching element 234, the sixth fuse 232 may allow the third power supply line 30 to be open-circuited in the circuit.

Figure 9:
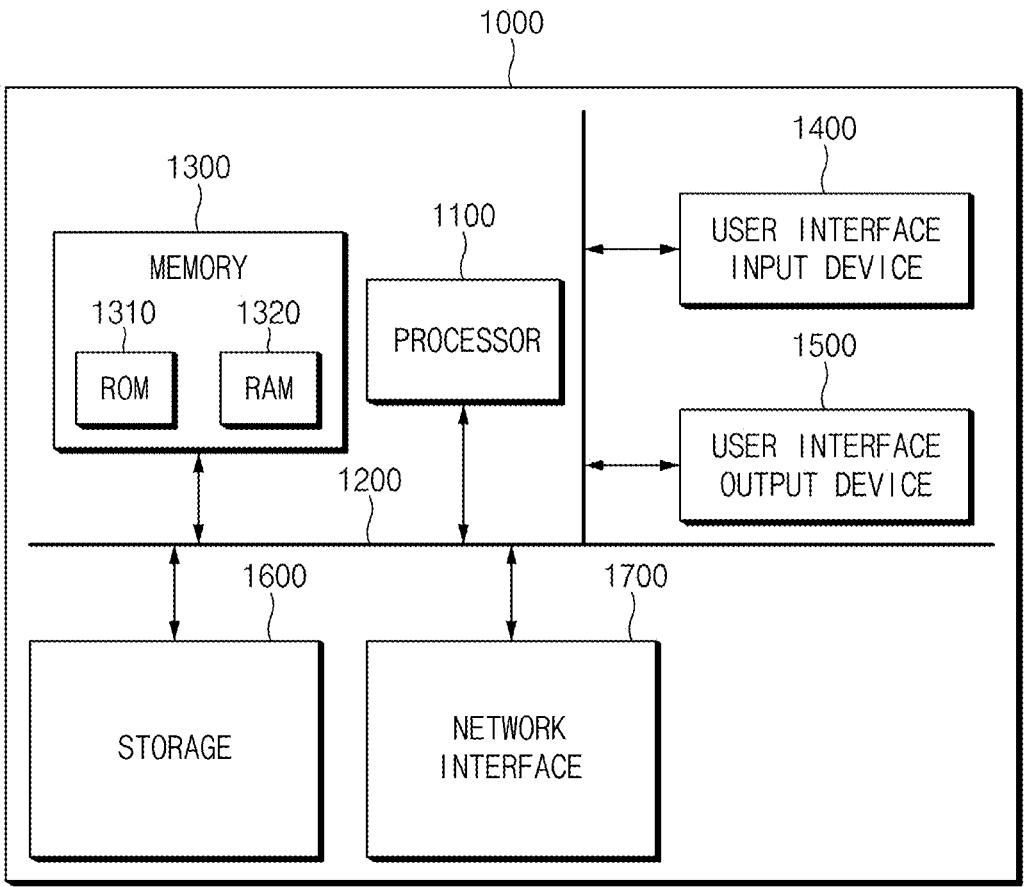
FIG. 9 is a block diagram illustrating a computing system for executing a method of supplying power to air mobility according to each embodiment of the present disclosure.

FIG. 9 is a block diagram illustrating a computing system for executing a method of supplying power to air mobility according to each embodiment of the present disclosure.

Referring to FIG. 9, a method of supplying power to air mobility according to each embodiment of the present disclosure described above may be implemented through a computing system 1000. The computing system 1000 may include at least one processor 1100, a memory 1300, a user interface input device 1400, a user interface output device 1500, storage 1600, and a network interface 1700 connected through a system bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor 1100 and the storage medium may reside in an application specific integrated circuit (ASIC). The ASIC may reside in a user terminal. In another method, the processor 1100 and the storage medium may reside in the user terminal as an individual component.

Although the above-described exemplary methods of the present disclosure are expressed as a series of operations for clarity of explanation, this is not intended to limit the order in which the operations are performed, and where necessary, each operation may be performed simultaneously or in a different order. In order to implement the methods according to the present disclosure, other operations may be included in addition to the exemplified operations, some operations may be excluded and the remaining operations may be included, or some operations may be excluded and additional other operations may be included.

The various embodiments of the present disclosure do not list all possible combinations, but are intended to explain representative aspects of the present disclosure, and matters described in the various embodiments may be applied independently or in combination of two or more.

In addition, various embodiments of the present disclosure may be implemented by hardware, firmware, software, or any combination thereof. In the case of implementation by hardware, the embodiments may include one or more application specific integrated circuits (ASICs), digital signal processors (DSPs), digital signal processing devices (DSPDs), programmable logic devices (PLDs), field programmable gate arrays (FPGAs), general purpose processors, controllers, microcontrollers, microprocessors, or the like.

The scope of the present disclosure includes software or machine-executable instructions (e.g., an operating system, an application, a firmware, program, and the like) that cause operations according to the methods of various embodiments to be executed on a device or computer, and non-transitory computer-readable medium in which such software or instructions, and the like are stored and executable on a device or computer.

According to the embodiments of the present disclosure, the power supply device for air mobility may include the plurality of power supply lines that distribute the power of the fuel cell stack in parallel, may match the plurality of power supply lines with the plurality of rotor structures in one-to-one manner, and may supply the power to one rotor structure through one power supply line, thereby supplying power to the remaining rotor structures through the remaining power supply lines even when a short circuit occurs in a semiconductor switching element on any one of the plurality of power supply lines, and a method thereof.

Effects obtained by various embodiments of the disclosure may not be limited to the above, and other effects will be clearly understandable to those having ordinary skill in the art from the following disclosures.

What is claimed is:
1. A power supply device comprising:
a fuel cell stack configured to supply power to an air mobility; and
a converter including a plurality of power supply lines that distribute power of the fuel cell stack in parallel and are configured to one-to-one match the plurality of power supply lines with a plurality of rotor structures and supply power to one rotor structure through one power supply line; wherein the converter includes:

a first power supply line configured to distribute the power of the fuel cell stack in parallel and supply the power to a first rotor structure;

a second power supply line configured to distribute the power of the fuel cell stack in parallel and supply the power to a second rotor structure; and a third power supply line configured to distribute the power of the fuel cell stack in parallel and supply the power to a third rotor structure.

2. The power supply device of claim 1, wherein the first power supply line includes a first fuse, a second fuse, a first semiconductor switching element, and a second semiconductor switching element.

3. The power supply device of claim 2, wherein the first fuse is configured to open-circuit the first power supply line in a circuit when a short circuit occurs in the first semiconductor switching element.

4. The power supply device of claim 2, wherein the second fuse is configured to open-circuit the first power supply line in a circuit when a short circuit occurs in the second semiconductor switching element.

5. The power supply device of claim 1, wherein the second power supply line includes a third fuse, a fourth fuse, a third semiconductor switching element, and a fourth semiconductor switching element.

6. The power supply device of claim 5, wherein the third fuse is configured to open-circuit the second power supply line in a circuit when a short circuit occurs in the third semiconductor switching element.

7. The power supply device of claim 5, wherein the fourth fuse is configured to open-circuit the second power supply line in a circuit when a short circuit occurs in the fourth semiconductor switching element.

8. The power supply device of claim 1, wherein the third power supply line includes a fifth fuse, a sixth fuse, a fifth semiconductor switching element, and a sixth semiconductor switching element.

9. The power supply device of claim 8, wherein the fifth fuse is configured to open-circuit the third power supply line in a circuit when a short circuit occurs in the fifth semiconductor switching element.

10. The power supply device of claim 8, wherein the sixth fuse is configured to open-circuit the third power supply line in a circuit when a short circuit occurs in the sixth semiconductor switching element.

11. The power supply device of claim 1, wherein the rotor structure includes:

an inverter configured to convert DC power of the fuel cell stack into AC power; and a motor configured to be driven by the AC power to rotate the rotor.

12. A method for supplying power comprising:

one-to-one matching, by a converter, a plurality of power supply lines which distributes power of a fuel cell stack in parallel with a plurality of rotor structures; and supplying, by the converter, power to one rotor structure through one power supply line; wherein the supplying of the power to the rotor structure includes:

distributing, by a first power supply line, the power of the fuel cell stack in parallel to supply the power to a first rotor structure;

distributing, by a second power supply line, the power of the fuel cell stack in parallel to supply the power to a second rotor structure; and distributing, by a third power supply line, the power of the fuel cell stack in parallel to supply the power to a third rotor structure.

13. The method of claim 12, wherein the first power supply line includes a first fuse, a second fuse, a first semiconductor switching element, and a second semiconductor switching element.

14. The method of claim 13, wherein the supplying of the poser to the first rotor structure further includes:

opening, by the first fuse, the first power supply line in a circuit when a short circuit occurs in the first semiconductor switching element; and opening, by the second fuse, the first power supply line in a circuit when a short circuit occurs in the second semiconductor switching element.

15. The method of claim 12, wherein the second power supply line includes a third fuse, a fourth fuse, a third semiconductor switching element, and a fourth semiconductor switching element.

16. The method of claim 15, wherein the supplying of the poser to the second rotor structure further includes:

opening, by the third fuse, the second power supply line in a circuit when a short circuit occurs in the third semiconductor switching element; and opening, by the fourth fuse, the second power supply line in a circuit when a short circuit occurs in the fourth semiconductor switching element.

17. The method of claim 12, wherein the third power supply line includes a fifth fuse, a sixth fuse, a fifth semiconductor switching element, and a sixth semiconductor switching element.

18. The method of claim 17, wherein the supplying of the poser to the third rotor structure further includes:

opening, by the fifth fuse, the third power supply line in a circuit when a short circuit occurs in the fifth semiconductor switching element; and opening, by the sixth fuse, the third power supply line in a circuit when a short circuit occurs in the sixth semiconductor switching element.

* * * * *